United States Patent [19]

Kawashima

[11] Patent Number: 5,323,868
[45] Date of Patent: Jun. 28, 1994

[54] DRIVE APPARATUS FOR HYBRID VEHICLE

[75] Inventor: Yoshihiro Kawashima, Susono, Japan

[73] Assignee: Toyota Jidosha Kabushiki Kaisha, Toyota, Japan

[21] Appl. No.: 871,656

[22] Filed: Apr. 21, 1992

[30] Foreign Application Priority Data

Apr. 30, 1991 [JP]   Japan .................................. 3-099165

[51] Int. Cl.$^5$ ............................................. B60K 11/04
[52] U.S. Cl. ..................... 180/65.4; 60/300; 123/142.5 E; 180/65.3; 180/165; 180/309
[58] Field of Search ............. 180/65.1, 65.2, 65.3, 180/65.4, 309, 69.6, 165; 123/142.5 E; 60/300

[56] References Cited

U.S. PATENT DOCUMENTS 2,212,296 9/1940 Ogden ........................... 123/142.5 E
3,894,605 7/1975 Salvadorini ........................ 180/65.4

FOREIGN PATENT DOCUMENTS 56-17724 4/1981 Japan .
62-36934 3/1987 Japan .
62-36935 3/1987 Japan .
8502882 7/1985 World Int. Prop. O. ............ 60/300

*Primary Examiner*—Eric Culbreth
*Attorney, Agent, or Firm*—Finnegan, Henderson, Farabow, Garrett and Dunner

[57] ABSTRACT

A drive apparatus for a hybrid vehicle equipped with an engine and a motor, heats the engine or a catalytic converter using the regenerated electricity of the motor. As the temperature of the engine or the catalyst thus rises, air polluting components in an exhaust gas discharged via the motor or the catalyst converter are reduced. Typical air polluting components are NC, NOx and CO.

10 Claims, 5 Drawing Sheets

DRIVE APPARATUS FOR HYBRID VEHICLE

BACKGROUND OF THE INVENTION

1. Field of the Invention:

This invention relates to a drive apparatus for a hybrid vehicle having an engine and a driving motor, and more particularly to the treatment of exhaust gas produced when the engine is activated.

2. Description of the Related Art:

In recent years, for the purposes of air environment protection and noise reduction, a so-called electric vehicle equipped with an electric motor as a drive source has commanded a lot of attention. However, a battery to activate the electric motor has only a limited capacity so that the electric vehicle can travel only a limited distance on one battery charging, compared to gasoline vehicles. Further, unlike filling up with gasoline, it takes a long time to charge up the battery of the electric vehicle so that it is impossible to increase uninterrupted mileage to a considerable extent.

To this end, a hybrid vehicle has been proposed which suppresses the exhaust gas and noise problems of the conventional gasoline vehicles and complements the disadvantage of the electric vehicles. In this hybrid vehicle, a generator is activated by the engine to supply electricity to a motor for driving the vehicle and also to accumulate electricity in a battery. In the hybrid vehicle, like the conventional electric vehicle, the battery can supply electricity to the motor for driving the vehicle. Further, since variance in output torque can be damped by the battery, it is possible to operate the engine in a constant condition, irrespective of the travelling conditions of the vehicle. It is therefore possible to operate the engine so as to cause less noise and less noxious substances to be contained in the exhaust gas.

FIG. 5 of the accompanying drawings shows, of the prior hybrid vehicles, a so-called series hybrid vehicle. The series hybrid vehicle comprises an engine 1 to be driven by fuel such as gasoline, a generator 2 to be activated by the engine 1 to generate d.c. electricity, a battery 3 for accumulating the electricity generated by the generator 2, an inverter 4 for converting the d.c. electricity from the generator 2 and the battery 3 into a needed value of a.c. electricity, an induction motor 6 to be activated by the a.c. electricity from the inverter 4, and a transmission or gearbox 7 for transmitting the driving force of the motor 6 to tires 8.

During power running, fuel such as gasoline is supplied to the engine 1 for rotation at a predetermined r.p.m. The torque of the engine 1 is transmitted to the generator 2 for conversion into d.c. electricity. Of the thus obtained electricity, an amount sufficient to drive the motor 6 is sent to the motor 6 via the inverter 4 and the surplus electricity is accumulated in the battery 3. On the other hand, the torque of the motor 6 is transmitted to the tires 8 via the transmission 7 to cause the hybrid vehicle to travel. When the electricity sent to the motor 6 from the generator 2 is short, the battery 3 supplies the shortage. The supply of electricity to the motor 6 is varied by controlling a built-in switching device of the inverter 4 to react accordingly to the extent of stepping on the accelerator or gas pedal.

On the other hand, to lower the speed of the hybrid vehicle, regenerative braking is used as a counterpart to engine braking. Regenerative braking is performed as the switching device built into the inverter 4 is controlled. During this regeneration, rotational energy is given to the motor 6 from the tires 8 via the transmission 7. Regenerated electricity is produced from the motor 6. This regenerated electricity is converted into d.c. electricity by the inverter 4, and is then accumulated in the battery 3.

As mentioned above, the hybrid vehicle carries the engine 1. Whenever the engine 1 is operated, it produces exhaust gas; consequently the most important subject currently is to realize low environmental pollution by minimizing air polluting substances in the exhaust gas.

The emission of air polluting substances in the exhaust varies sharply as the operating condition of the engine 1 is changed. For example, if the engine 1 is started at the beginning of operation when it is low in temperature (cold starting), the emission of air polluting substances is increased very much. Usually the vehicle is equipped with an exhaust gas cleaner called a catalytic converter; if this catalytic converter works adequately, the exhaust gas contains only a very small amount of air polluting substances. If it is low in temperature, however, the catalytic converter works inadequately so that the emission of air polluting substances such as hydrocarbon (HC) is increased. Thus if an engine-related part or element, such as the engine body or the catalytic converter, is low in temperature, air polluting substances in the exhaust gas are increased.

Japanese Utility Model Publication No. SHO 56-17724 discloses a concept of warming up the engine using the electricity from the battery. In this prior art, since a heater dedicated for warming-up is used, it is impossible to use regenerated electricity efficiently.

SUMMARY OF THE INVENTION

It is therefore an object of this invention to provide a drive apparatus which uses electricity efficiently and can make the engine of a vehicle less polluting.

According to the invention, there is provided a drive apparatus for a vehicle, comprising: a motor serving as a drive source of the vehicle and adapted to regenerate electricity; means operable, in response to an mechanical output of an engine, for generating electricity and for supplying the electricity to the motor to activate the motor; means for heating the engine or a target part relating to an exhaust gas from the engine using the regenerated electricity of the motor; and means for controlling the heating means to suppress the content of a predetermined component in the exhaust gas.

In the drive apparatus of this invention, the regenerated electricity is effectively used to reduce the emission from the engine. In the prior art, a heater to which electricity is supplied from another source is used to heat the engine, whereas in this invention, since the emission can be reduced by using the regenerated electricity, it is possible to achieve an improved degree of energy efficiency.

The target for heating may be examplified as the engine or a catalytic converter.

In a first example, it avoids cold starting by heating the engine using the regenerated electricity of the motor, without using any separate electricity source.

In a second example, it hastens the catalytic reaction by heating a catalytic converter. The catalytic converter serves to remove air polluting substances from the engine's exhaust gas, and the heater serves to increase the amount of the removed air polluting substances by using the regenerated electricity of the motor rather than electricity from a separate source.

The electricity supplying means have to be equipped with at least a means responsive to the mechanical output of the engine for generating electricity. If the generating means is a d.c. type and the motor is an a.c. motor, it further requires a means such as an inverter for converting the d.c. electricity, which is obtained by the generating means, into a.c. electricity.

Preferably, the drive apparatus further includes a means such as a battery for accumulating the generated output of the generating means and the regenerated electricity of the motor and for supplying the electricity to the motor and the suppressing means. With this accumulating means, it is possible to control the drive apparatus so as to drive the vehicle as an electric vehicle, when the temperature of a target part or element (e.g., the engine or the catalytic converter) to be heated by the heating means is lower than a predetermined temperature, and so as to drive the vehicle as a hybrid vehicle, when it is higher than the predetermined temperature. In driving the vehicle as an electric vehicle, the motor is activated only by the electricity from the battery, without operating the engine. In driving the vehicle as a hybrid vehicle, the engine is operated to activate the generating means by the mechanical output of the engine to generate electricity, and the motor is activated by both the last-named electricity and the electricity from the battery.

Further, the condition in which the engine or the catalytic converter are to be heated is determined in the order of controlling.

For example, if the battery is inadequately charged, the regenerated electricity is used to charge this battery. Conversely, if the battery is adequately charged, it is possible to select the use of the regenerated electricity to heat the engine or the catalytic converter. Further, if the engine was started when the temperature of the engine or the catalytic converter was lower than a predetermined temperature, it would have resulted in cold starting. Whereas, according to this invention, it is possible to select heating the engine or the catalytic converter by the regenerated electricity only when the temperature of the engine or the catalytic converter is lower than a predetermined temperature.

Furthermore, the drive apparatus may further be equipped with a means for consuming, of the regenerated electricity of the motor, the partial electricity which is surplus to the suppressing means requirements so that it is possible to switch between supply of the regenerated electricity of the motor to the suppressing means and supply of the regenerated electricity of the motor to the consuming means. The temperature of cooling water may be detected as the temperature of the engine or catalytic converter.

DETAILED DESCRIPTION

Embodiments of this invention will now be described with reference to the accompanying drawings.

Figure 1:
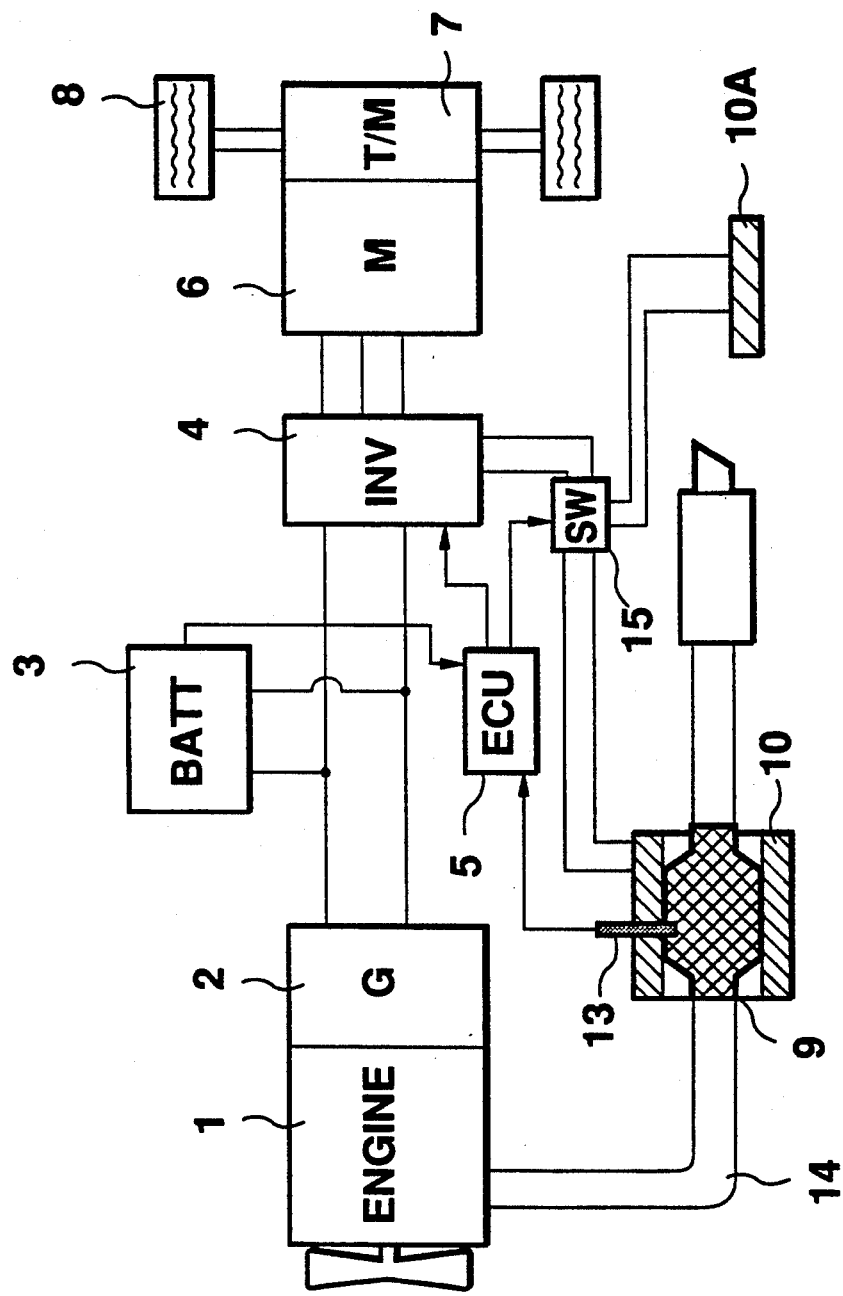
FIG. 1 is a block diagram showing a drive apparatus according to a first embodiment of this invention.
Figure 5:
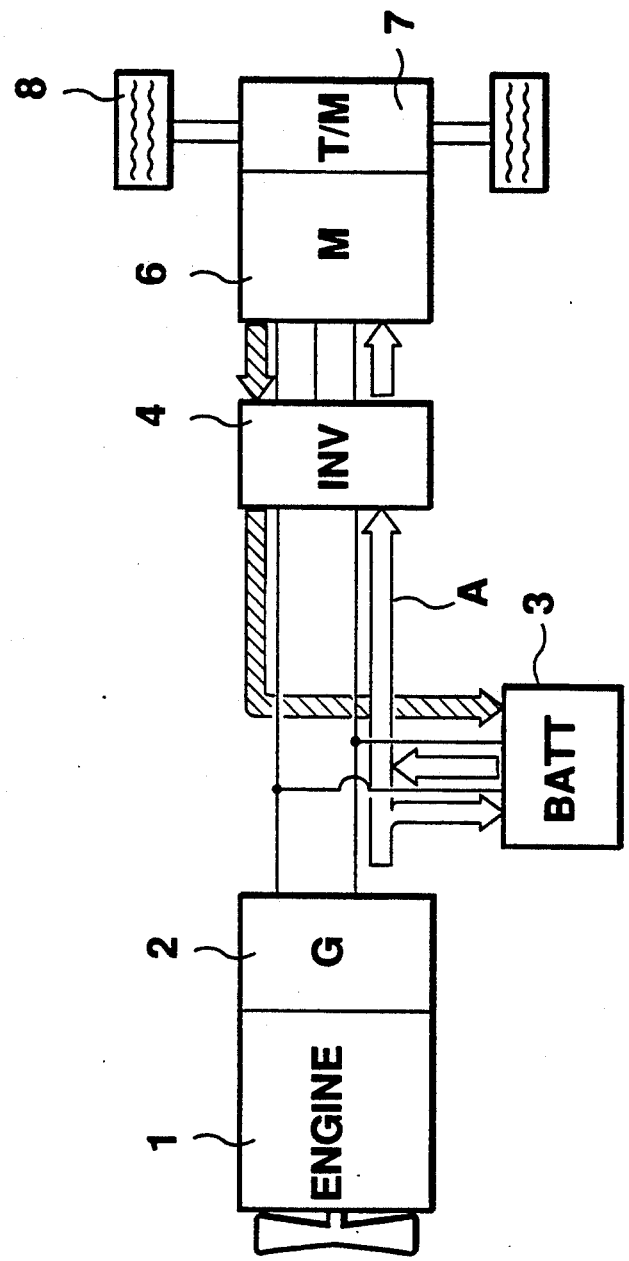
FIG. 5 is a block diagram showing a prior art drive apparatus.

FIG. 1 shows a drive apparatus for a hybrid vehicle, according to a first embodiment of the invention; parts or elements similar to those of the prior art shown in FIG. 5 are designated by like reference numerals, and any repetition of description is omitted.

An exhaust pipe 14 of the engine 1 is provided with a catalytic converter 9 for cleaning the exhaust gas. The catalytic converter 9 removes hydrocarbon (HC), carbon monoxide (CO) and nitrogen oxide (NOx) in the exhaust gas by catalytic action; it oxidizes HC and CO, and reduces NOx. For this purpose, the catalytic converter 9 is packed with, for example, catalyst pellets so that the above-mentioned oxidation and reduction will occur when the exhaust gas comes into contact with the catalyst. For an adequate demonstration of the catalytic action, it is necessary to keep the temperature of the catalyst at a temperature of at least about 600° C. The catalyst is usually kept at a high temperature by high-temperature exhaust gas.

In the catalytic converter 9, there is provided a temperature sensor 13 for detecting the temperature of the catalytic converter 9, around which a discharge resistor 10 is located for heating the catalytic converter 9. The discharge resistor 10 will produce heat upon receipt of current from the inverter 4. To the inverter 4, a discharge resistor 10A is also connected so that it is possible to switch, using a circuit change-over switch 15, between supply of the electricity from the inverter 4 to the discharge resistor 10 and supply of the electricity from the inverter 4 to the discharge resistor 10A. The drive apparatus also includes an electronic control unit (ECU) 5 for controlling the engine 1, the inverter 4 and the circuit change-over switch 15 based on the voltage of the battery 3 and the temperature of the catalytic converter 9 detected by the temperature sensor 13.

The operation of the drive apparatus will now be described with reference to the flow diagram of FIG. 2. First of all, the ECU 5 determines whether or not an ignition switch (not shown) is on (step S101). If it is on, the ECU 5 compares the temperature of the catalytic converter 9 with a predetermined temperature TO based on the data from the temperature sensor 13 (step S102). This predetermined temperature TO is preset to the lowest temperature needed to start the engine 1. The result of this discrimination is that if the temperature of the catalytic converter 9 is higher than the predetermined temperature TO, the ECU 5 starts the engine 1 so that the hybrid vehicle can start running as a gasoline-operated vehicle in the usual manner (step S103). If the engine 1 has already been started, it is essential to simply continue operating the engine 1.

In this state, the ECU 5 further determines whether or not it is at the time of regeneration braking (step S105). The reason for this is that although as much of the electricity generated by regeneration braking as possible should be collected, it would shorten the life of the battery 3 if overcharged. At step S105, a decision is made as to whether or not the battery 3 may be charged. If the voltage of the battery 3 is lower than a predetermined high voltage, the ECU 5 recognizes the battery 3 to be chargeable and then supplies the regenerated electricity to the battery 3 under the control of the switch 15 (step S106).

If the voltage of the battery 3 is higher than the predetermined high voltage, it is not preferable that the battery 3 be charged. The ECU 5 then determines whether or not the temperature of the catalytic converter 9 is higher than a predetermined temperature T1 (step S107). This predetermined temperature T1 is preset to a value higher than the predetermined temperature T0 and is a temperature to be used when deciding whether or not the temperature of the exhaust gas is adequately high. The temperature of the catalytic converter 9 is measured by the temperature sensor 13. If the temperature of the catalytic converter 9 is higher than the predetermined temperature T1, it is not necessary to heat the catalytic converter 9, and it is in fact preferable that the catalytic converter 9 is not heated. The ECU 5 then supplies the regenerated electricity to the discharge resistor 10A under the control of the switch 15, and the discharge resistor 10A discharges regenerated energy (step S108), thus securing an adequate regeneration braking force.

If the temperature of the catalytic converter 9 is lower than the predetermined temperature T1, the catalytic converter 9 may be heated. Therefore it is possible to supply electricity to the discharge resistor 10, and so the ECU 5 supplies the regenerated electricity to the discharge resistor 10 (step S109). As it repeats these procedures, the ECU 5 supplies the regeneration braking electricity to the discharge resistor 10, the discharge resistor 10A or the battery 3 to perform necessary regeneration braking.

Then as the result of determining the temperature of the catalytic converter 9 at step 102, if the temperature of the catalytic converter 9 does not reach the predetermined temperature T0, the ECU 5 does not start the engine 1 and activates the motor 6 to cause the hybrid vehicle to travel as an electric vehicle (step S110). While causing the vehicle to travel as an electric vehicle, the ECU 5 makes the discharge resistor 10 conductive under the control of the switch 15 (step S111). By this control, the temperature of the catalytic converter 9 rises quickly to reach the predetermined temperature T0 so that the hybrid vehicle can then travel as a gasoline-operated vehicle.

As described above, in this embodiment, if the temperature of the catalytic converter 9 is lower than the predetermined temperature T0, the engine 1 is not started and the catalytic converter 9 is heated by the discharge resistor 10. Therefore it is possible to prevent the engine 1 from being operated in the condition where the temperature of the catalytic converter 9 is low and the exhaust gas cleaning ability is inadequate, thus preventing any increased concentration of air polluting substances such as HC in the exhaust gas. During regeneration braking, since the ECU 5 causes the switch 15 to switch between supply of the regenerated electricity to the battery and supply of the regenerated electricity to the discharge resistors 10, 10A, depending on the voltage of the battery 3, it is possible to prevent the battery 3 from being adversely affected by excessive regenerated electricity. Further, if the voltage of the battery 3 is adequately high and the battery 3 cannot accumulate electricity, the regenerated electricity can be consumed by the discharge resistor 10A, when the temperature of the catalytic converter 9 is higher than the predetermined temperature T1, and can be consumed by the discharge resistor 10, when the temperature of the catalyst converter 9 is lower than the predetermined temperature T1. Therefore it is possible to secure an adequate regeneration braking force, protecting the battery 3.

Figure 3:
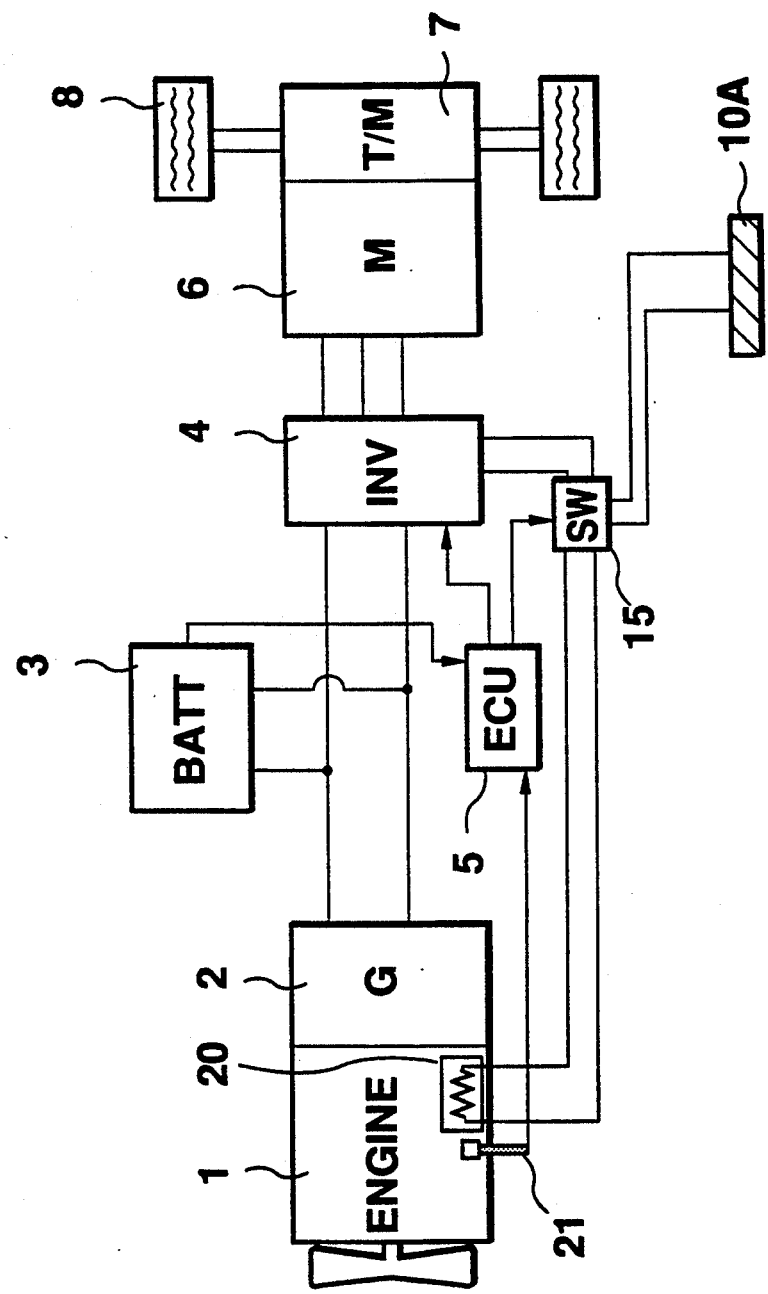
FIG. 3 is a block diagram showing a modified drive apparatus according to a second embodiment of the invention.

FIG. 3 shows a modified drive apparatus according to a second embodiment in which the engine 1 is to be heated. Parts or elements similar to those of FIG. 1 are designated by like reference numerals, and any repetition of description is omitted. In this embodiment, the engine 1 is equipped with a heater and a temperature sensor. If the temperature of the engine 1 is low, the engine 1 will be heated.

Figure 4:
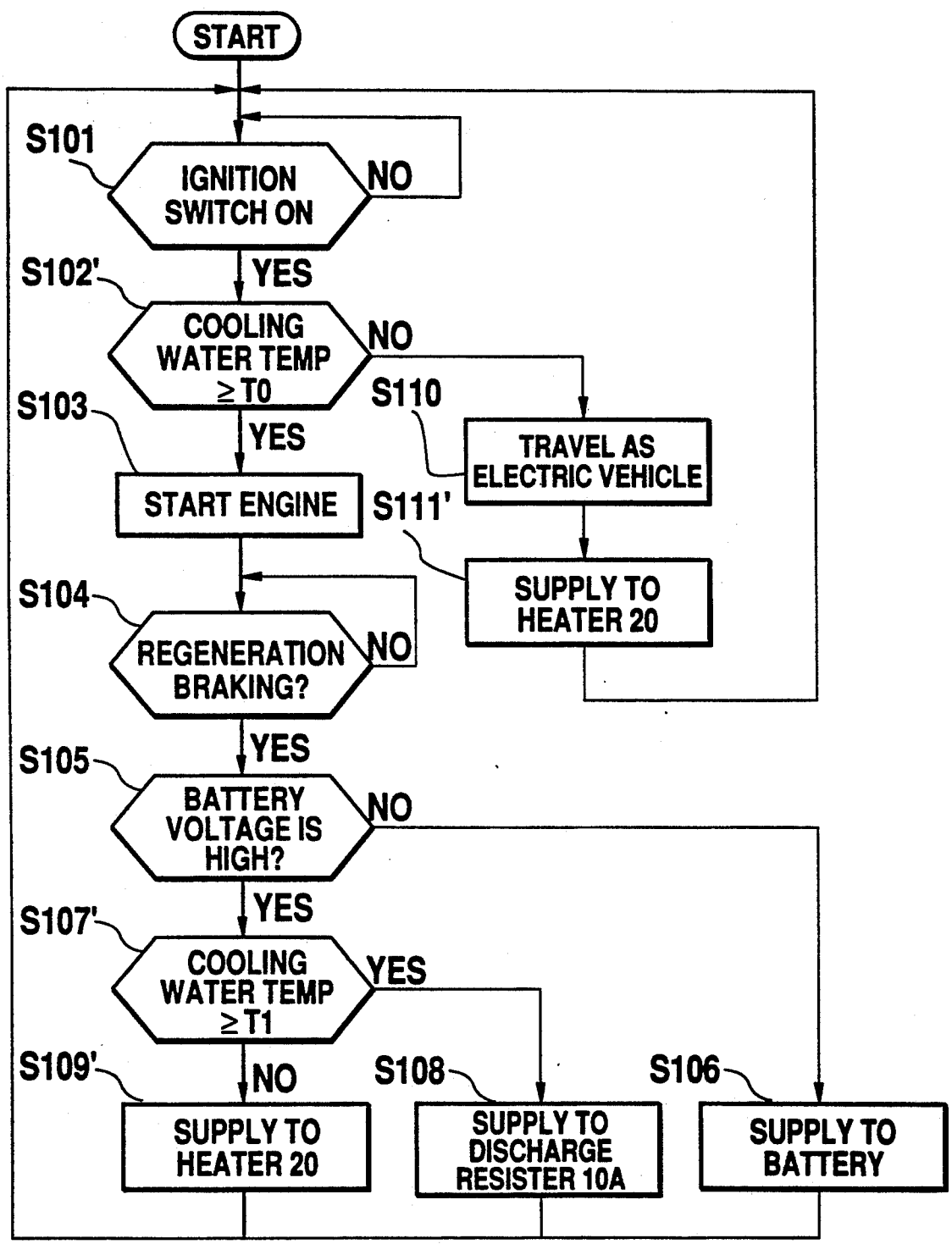
FIG. 4 is a block diagram showing the mode of control by the ECU in the second embodiment.

FIG. 4 shows how the engine 1 is to be heated in the second embodiment. Steps similar to those of FIG. 2 are designated by like reference numerals, and repetition of description is omitted. In this embodiment, at step S102, the ECU 5 determines, from the output of a temperature sensor 21, whether or not the temperature of the cooling water is higher than a predetermined temperature T0. If the temperature of the cooling water is lower than the predetermined temperature T0, the ECU 5 causes the vehicle to travel as an electric vehicle (step S110) and makes a heater 20 conductive under the control of the switch 15 (step S111). On the other hand, if the temperature of the cooling water is higher than the predetermined temperature T0, the ECU 5 executes step S103 to start the engine 1. At step S107, the ECU 5 determines, based on the output of the temperature sensor 21, whether or not the temperature of the cooling water is higher than the predetermined temperature T1. As the result of his determination, if it is higher than the predetermined temperature T1, the ECU 5 presumes that it is not favorable to heat the engine 1 and so supplies current to the discharge resistor 10A via the switch 15 (step S108). If it is lower than the predetermined temperature T1, the ECU 5 makes the heater 20 conductive via the switch 15 to heat the engine 1 (step S109). By this control, if the temperature of the engine 1 is low, it is possible to heat the engine 1 before starting so that the engine 1 can be operated only in a frictionless condition, and it is possible to suppress the emission of air polluting substances from the engine 1 to a minimum.

Figure 2:
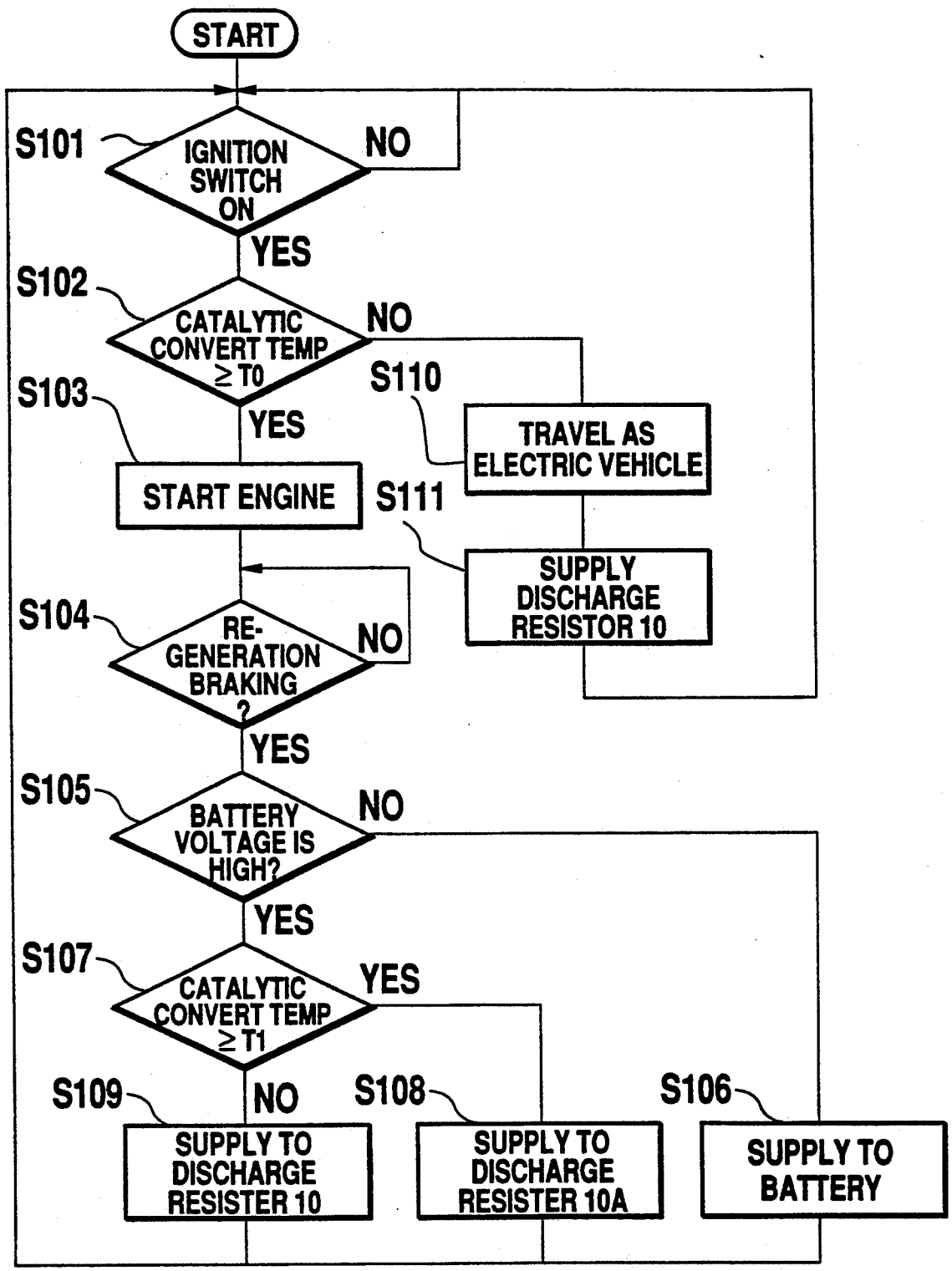
FIG. 2 is a flow diagram showing the mode of control by an electronic control unit (hereinafter called "ECU") in the first embodiment.

At step S105 of FIGS. 2 and 4, if the voltage of the battery 3 is not a high voltage, the regenerated electricity will be supplied to the battery 3 without fail. However, if heating is needed, it may advance to step S107 or S108 even when the battery voltage is not a high voltage. In the illustrated embodiments, the engine-related parts to be heated are the catalytic converter 9 and the engine 1. Alternatively, the engine-related part may be any other element or medium, such as engine oil, whose temperature can rise when heated.

According to the drive apparatus of this invention, since the engine is started after heating an engine-related part to clean the exhaust gas of the engine, it is possible to realize a considerably improved low-pollution hybrid vehicle. Further, since the regenerated electricity can be used in heating, an improved energy efficiency can be achieved.

What is claimed is:
1. A drive apparatus for a vehicle, comprising:
 a motor serving as a drive source of the vehicle and at times serving to regenerate electricity;
 an electrical generator responsive to a mechanical output of an engine for generating electricity and for supplying the generated electricity to said motor to activate said motor;

means using the regenerated electricity of the motor for heating at least one of the engine and a device positioned in the path of an exhaust gas from the engine;

means responsive to the regenerated electricity for heating the device in the path of the exhaust gas at times when the temperature of said device is lower than a predetermined temperature; and means for controlling the heating means to suppress the content of pollutants in the exhaust gas.

2. A drive apparatus according to claim 1, further comprising a battery;

and means responsive to the regenerated electricity of the motor for heating one of the engine and the device at times when the battery is charged to a predetermined level and when the temperature of said one of the engine and device is lower than a predetermined temperature.

3. A drive apparatus according to claim 1, wherein the device includes a catalytic converter for reducing the amount of the pollutants in the exhaust gas by catalytic reaction.

4. The drive apparatus of claim 1 wherein the heating means is a discharging resistor for consuming surplus energy of the regenerated electricity of the motor.

5. The drive apparatus of claim 4 wherein the discharging resistor is positioned in the path of the exhaust gas from the engine.

6. A drive apparatus for a vehicle comprising:
a battery;
a motor serving as a drive source of the vehicle and at times serving to regenerate electricity;
an electrical generator responsive to a mechanical output of an engine for generating electricity and for supplying the generated electricity to said motor to activate said motor;
means responsive to the regenerated electricity of the motor for heating at least one of the engine and a device in a path of an exhaust gas from the engine at times when the battery is charged to a predetermined level and when the temperature of at least one of the engine and said device is lower than a predetermined temperature;
a device electrically coupled to the motor for consuming the regenerated electricity at times when the battery is charged to a predetermined level and the temperature of said at least one of the engine and the device is higher than the predetermined temperature; and
means for controlling the heating means to suppress the content of pollutants in the exhaust gas.

7. A drive apparatus according to claim 6, wherein said regenerated electricity consuming device includes a discharge resistor.

8. A drive apparatus for a vehicle, comprising:
a battery;
a motor serving as a drive source of the vehicle and at times serving to regenerate electricity;
an electrical generator responsive to a mechanical output of an engine for generating electricity and for supplying the generated electricity to said motor to activate said motor;
means using the regenerated electricity of the motor for heating at least one of the engine and a device in the path of an exhaust gas from the engine;
means responsive to electricity from the battery, at times when one of the engine and the device has a temperature lower than a predetermined temperature, for deactivating the engine and activating the motor;
means, operable at times when the temperature of the one of the engine and device is higher than the predetermined temperature, for activating the engine and the generator to activate the motor in response to the generated electricity and electricity from the battery; and
means using the regenerated electricity of the motor for heating at least one of the engine and a device in the path of an exhaust gas from the engine; and
means for controlling the heating means to suppress the content of pollutants in the exhaust gas.

9. A drive apparatus for a vehicle, comprising:
a motor serving as a drive source of the vehicle and at times serving to regenerate electricity;
an electrical generator responsive to a mechanical output of an engine for generating electricity and for supplying the generated electricity to said motor to activate said motor;
means using the regenerated electricity of the motor for heating at least one of the engine and a device in the path of an exhaust gas from the engine;
means for detecting the temperature of engine cooling water to determine the temperature of said at least one of the engine and the device to be heated; and
means for controlling the heating means to suppress the content of pollutants in the exhaust gas.

10. A drive apparatus for a vehicle, comprising:
a motor serving as a drive source of the vehicle and at times serving to regenerate electricity;
an electrical generator responsive to a mechanical output of an engine for generating electricity and for supplying the generated electricity to said motor to activate said motor;
means using the regenerated electricity directly supplied by the motor for heating at least one of the engine and a device in the path of an exhaust gas from the engine; and
means for controlling the heating means to suppress the content of pollutants in the exhaust gas.

* * * * *

UNITED STATES PATENT AND TRADEMARK OFFICE
CERTIFICATE OF CORRECTION

PATENT NO. : 5,323,868
DATED : June 28, 1994
INVENTOR(S) : Yoshihiro Kawashima

It is certified that error appears in the above-indentified patent and that said Letters Patent is hereby corrected as shown below:

Claim 8, column 8, delete lines 22-24.

Signed and Sealed this

Sixth Day of December, 1994

*Attest:*

BRUCE LEHMAN

*Attesting Officer*  *Commissioner of Patents and Trademarks*